United States Patent [19]
Redford

[11] Patent Number: 5,946,222
[45] Date of Patent: Aug. 31, 1999

[54] METHOD AND APPARATUS FOR PERFORMING A MASKED BYTE ADDITION OPERATION

[75] Inventor: John L. Redford, Cambridge, Mass.

[73] Assignee: Oak Technology, Inc., Sunnyvale, Calif.

[21] Appl. No.: 08/770,457

[22] Filed: Dec. 20, 1996

[51] Int. Cl.[6] .................. G06F 7/38; G06F 7/50
[52] U.S. Cl. ...................... 364/736.01; 364/768
[58] Field of Search .................. 364/736.01, 736.02, 364/736.03, 736.04, 750.5, 768, 784.01, 786.01, 786.04

[56] References Cited

U.S. PATENT DOCUMENTS

| | | | |
|---|---|---|---|
| 3,188,386 | 6/1965 | Byatt . | |
| 3,483,511 | 12/1969 | Rabinow . | |
| 3,569,616 | 3/1971 | Baker | 178/6.8 |
| 3,611,260 | 10/1971 | Colardeau | 339/89 R |
| 3,629,495 | 12/1971 | Cahill | 178/6.6 A |
| 3,676,850 | 7/1972 | Goldman et al. | 340/154 |
| 3,792,194 | 2/1974 | Wood et al. | 178/6.8 |
| 3,803,445 | 4/1974 | Wagner | 315/18 |
| 3,902,047 | 8/1975 | Tyler et al. | 235/61.11 |
| 3,922,059 | 11/1975 | Noguchi | 350/3.5 |
| 3,925,765 | 12/1975 | Berwin et al. | 340/172.5 |
| 3,959,582 | 5/1976 | Law et al. | 178/6.8 |
| 3,976,982 | 8/1976 | Eiselen | 340/172.5 |
| 4,002,827 | 1/1977 | Nevin et al. | 343/140 |
| 4,125,862 | 11/1978 | Catano | 358/140 |
| 4,168,488 | 9/1979 | Evans | 340/146.3 |
| 4,271,476 | 6/1981 | Lotspiech | 364/515 |
| 4,467,448 | 8/1984 | Regehr et al. | 364/900 |
| 4,545,069 | 10/1985 | Kermisch | 382/46 |
| 4,627,020 | 12/1986 | Anderson et al. | 364/900 |
| 4,658,430 | 4/1987 | Anderson et al. | 382/46 |
| 4,776,026 | 10/1988 | Ueyama | 382/46 |
| 4,783,834 | 11/1988 | Anderson et al. | 382/46 |
| 4,837,845 | 6/1989 | Pruett et al. | 382/46 |
| 4,970,682 | 11/1990 | Beckwith, Jr. et al. | 364/900 |
| 4,975,977 | 12/1990 | Kurosu et al. | 382/46 |
| 5,034,733 | 7/1991 | Okazawa et al. | 340/727 |
| 5,081,700 | 1/1992 | Crozier | 395/150 |
| 5,111,192 | 5/1992 | Kadakia | 340/727 |
| 5,199,101 | 3/1993 | Casick et al. | 395/115 |
| 5,271,064 | 12/1993 | Dhawan et al. | 382/266 |
| 5,295,237 | 3/1994 | Park | 395/137 |
| 5,365,601 | 11/1994 | Kadakia et al. | 382/46 |
| 5,396,236 | 3/1995 | Ueda | 341/50 |
| 5,408,670 | 4/1995 | Davies | 395/800.16 |
| 5,450,604 | 9/1995 | Davies | 395/800 |
| 5,483,354 | 1/1996 | Kessels et al. | 358/444 |
| 5,557,715 | 9/1996 | Ichiyanagi | 395/137 |
| 5,621,674 | 4/1997 | Gray et al. | 364/715.02 |
| 5,651,121 | 7/1997 | Davies | 395/376 |

*Primary Examiner*—Chuong Dinh Ngo
*Attorney, Agent, or Firm*—Testa, Hurwitz & Thibeault, LLP

[57] ABSTRACT

A method and apparatus for performing an add-masked byte operation on a word of digital data comprises a register for receiving the word, a register for receiving a mask byte, and a multiplication module for receiving inputs from the registers. A multiplier multiplies each byte in the word by a corresponding bit in the mask byte to obtain a series of partial products. A multiplexer shifts the partial products until the partial products are disposed in the same register location as the location of the partial product achieved with the least significant byte in the word. An arithmetic logic unit clears certain bits in the partial products and adds the partial products to obtain a sum. The use of an existing multiplier module in an image processing system eliminates the costs involved in providing additional hardware for performing an add-masked byte operation.

20 Claims, 5 Drawing Sheets

METHOD AND APPARATUS FOR PERFORMING A MASKED BYTE ADDITION OPERATION

FIELD OF THE INVENTION

This invention relates generally to performing an add operation on selected bytes within a word of digital data. Particularly, this invention relates to performing a masked-byte add operation using a multiplier.

BACKGROUND OF THE INVENTION

Pixels in an image can be represented by a pattern of bits having values indicative of luminescence levels. Image processing often requires the addition of bits in a 16, 32, or 64 bit word to obtain relative intensity levels or to achieve smoothing. For example, adding together the first three bytes of a 32 bit word can be used to find the average intensity in a 3×3 region of an image. When the intensity of a portion of an image is desired, certain bytes can be masked such that only the bytes representing the portion are added. This operation is known as a masked-byte add operation.

One conventional method of performing a masked-byte add operation involves the use of additional "adder" hardware. Although useful, such additional hardware can increase the cost and complexity of the image processing ship, while decreasing the speed and efficiency at which the system operates.

It is therefore an object of the present invention to provide a method and apparatus for performing a masked-byte add operation using conventional hardware in an image processing chip.

SUMMARY OF THE INVENTION

The present invention relates to a method and apparatus of adding byte values using a multiplier in an image processing system. The present invention can be used in image processing to obtain relative intensity levels or achieve smoothing.

The method of the present invention includes transferring from memory a plurality of byte values into a first register; transferring from memory a plurality of mask bit values into a second register; and using a multiplier to multiply each byte value by a bit value to obtain a plurality of partial products. The partial products obtained are then shifted and added.

The byte values appear in an order of significance in a word and the mask bits appear in an order of significance in a mask byte. The least significant byte of the word is multiplied by the least significant bit of the mask byte to obtain a first partial product; and each byte of successive significance of the word is multiplied by a corresponding bit of successive significance of the mask byte to obtain a plurality of second partial products. The plurality of second partial products are then shifted such that the second partial products are disposed in the same register location as the first partial product. Once the partial products are disposed in the same register location, the partial products are added and a sum is obtained.

As it is often desirable that certain of the byte values be left out of the addition operation, the mask byte can include a binary zero value that when multiplied by a byte in the word, causes the partial product to include a zero. Alternatively, it is often desirable for all bytes or at least one byte to be included in the add operation, and thus, the mask byte would include all binary one values, causing each partial product to include each byte.

The present invention further comprises an apparatus for performing a masked-byte add operation on an input word comprising at least two input bytes. The apparatus can include a first register storing an input word having a plurality of input bytes, a second register storing a mask byte having a plurality of mask bits; and a multiplier coupled to the first and second registers. The multiplier includes a multiplication module for multiplying each bit of the mask byte with an input byte to obtain a plurality of partial products, a multiplexer for shifting the plurality of partial products by a predetermined number of register locations, and an adder for adding the plurality of partial products. The use of an existing multiplier decreases the costs involved in providing additional circuitry to perform this operation.

The foregoing and other objects, features, and advantages of the invention will be come apparent from the following, more particular description of the preferred embodiments of the invention, as illustrated in the accompanying drawings.

DETAILED DESCRIPTION OF THE INVENTION

Figure 1:
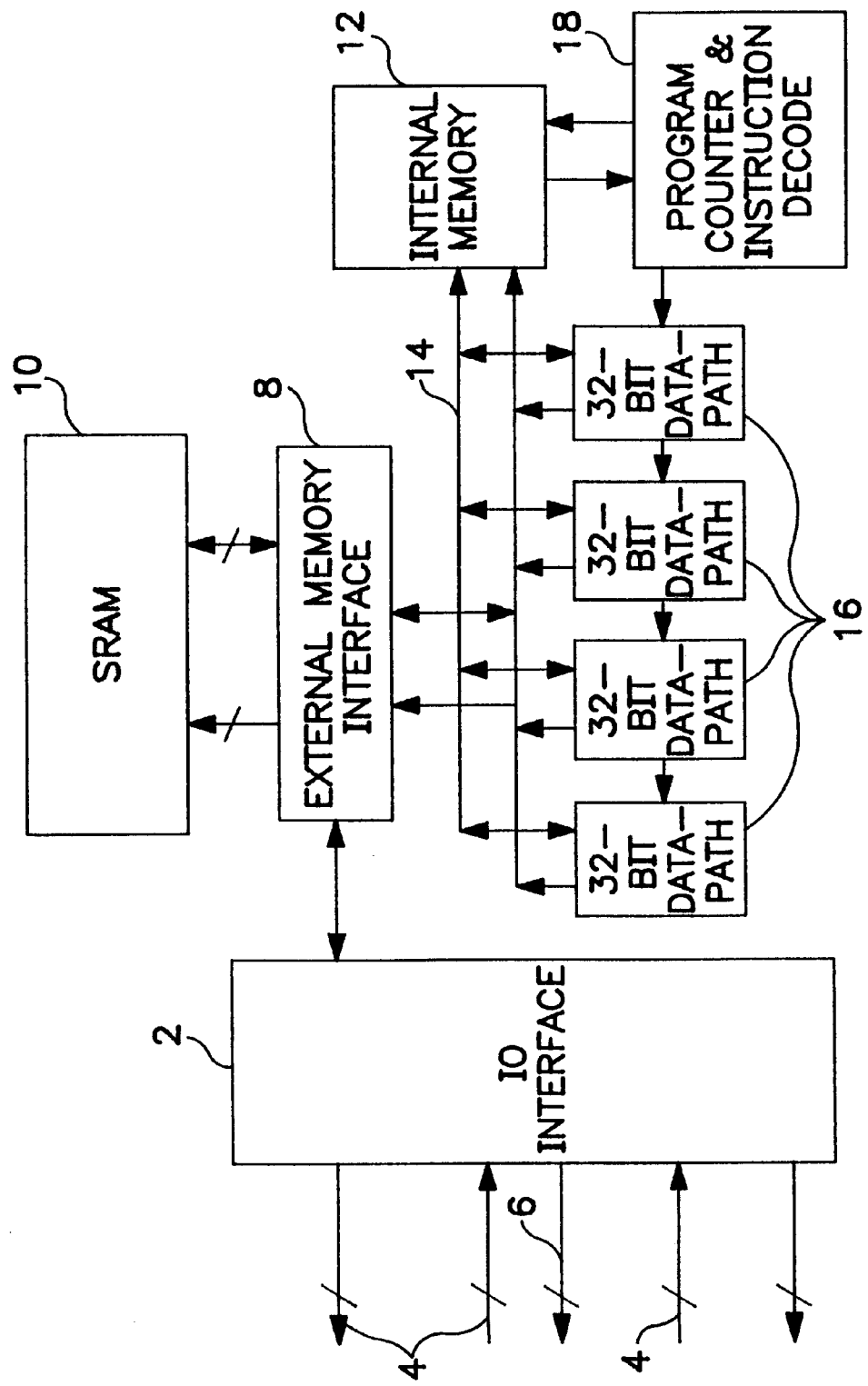
FIG. 1 is a block diagram of an apparatus for performing a masked-byte add operation according to one embodiment of the present invention.

Referring to FIG. 1, a block diagram of an apparatus for performing a masked-byte add operation (referred to interchangeably as an "add mask-byte operation") is shown. The apparatus shown in this figure can exist in an image processing chip (hereinafter "microchip") that interfaces with a standard microprocessor (not shown) used for image processing. An input-output interface 2 (hereinafter "I/O interface") receives over a plurality of input lines 4, commands from the microprocessor, as well as commands from peripheral devices such as scanners, printers and facsimile machines (not shown). The I/O interface 2 transmits data to such devices over a plurality of output lines 6. The I/O interface 2 is coupled to an external memory interface 8 that transfers data to and from an SRAM 10. Such data typically includes image data and can include instruction data (hereinafter interchangeably referred to as "instructions" "operations" or "microcode").

The internal memory module 12 can also store microcode. The internal memory module 12 interfaces with a plurality of datapaths 16 over a bus 14. In the present embodiment, each datapath 16 includes a register file (not shown) and a plurality of modules (not shown) for performing certain operations, such as, for example, multiplication and addition. In the present embodiment, the register file comprises thirty-two (32) general purpose registers, each of which is about thirty-two (32) bits in length.

Once data is stored in the SRAM 10, microcode instructions stored in the internal memory module 12 can read and manipulate the data, causing data to flow to the datapaths 16 via the external memory interface 8. Each datapath 16 supplies an address to the data transferred from the SRAM 10. Data is manipulated in the datapaths 16 and the results of such manipulation can be written back to the SRAM 10. A program counter and instruction decoder 18 (hereinafter PCID) interfaces with internal memory module 12 and the datapaths 16. The PCID 18 can receive instructions from the internal memory module 12, decode them and transfer them to the datapaths 16. The PCID 18 additionally serves as a counter.

Figure 2:
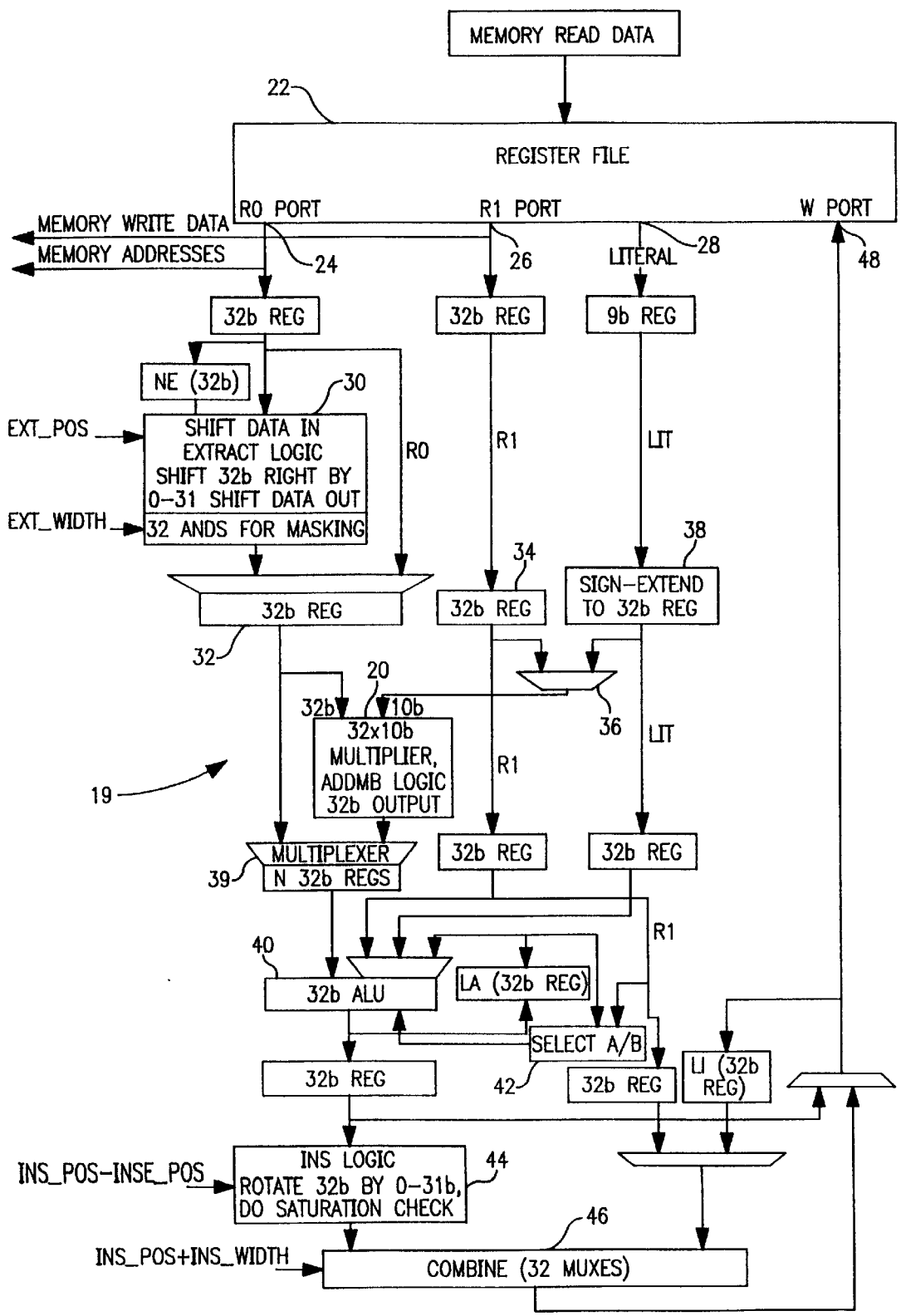
FIG. 2 is a block diagram, showing in further detail, the multiplier and register ports used for performing a masked-byte add operation according to one embodiment of the present invention.

Referring to FIG. 2, an embodiment of a datapath 16 including a multiplier module 19, according to one embodiment of the present invention is shown. As shown, a register file 22 receives memory data from the SRAM 10. In the present embodiment, data typically undergoing a masked-byte add operation is in the form of a thirty-two (32) bit word, comprising four input (4) bytes, each of which is eight (8) bits in length. Eight (8) bits is usually the standard pixel image length due to the limitations of the human eye. A mask byte is typically four (4) bits, however it is important to note that the number of bits in the mask byte typically equals the number of bytes undergoing an add-masked byte operation. The input bytes and the mask byte are outputted from the register file 22 through ports 24, 26, designated R0 and R1.

The word is outputted through the R0 port 24 and the mask byte is outputted through the R1 port 26. Data from port R0 can be transferred to an extractor 30 for extracting any contiguous bit field. In executing a masked byte add operation, the extractor 30 typically extracts the four input bytes, shifts the bytes, and loads them in a register 32. After the input bytes are loaded into the register, they are transferred to the multiplier 20 for multiplication with a mask byte. It is important to note that if a multiplication is the desired operation to be performed on the bytes, non-mask bytes can be transferred from the R1 port. Similarly, a nine bit constant value can be outputted through the Literal port and later used in a multiply operation with the input bytes transferred to the multiplier 20 through R0 port.

Referring again to the R1 port, the mask byte or other input bytes are transferred from a register 34 to an input of a multiplexer 36. Another input to the multiplexer 36 is a constant from the literal port 28. The multiplexer 36 selects which of the inputs is to be enabled. If an operation is to occur using the bytes transferred from port R1 (i.e. a mask byte or an input byte) the R1 port is enabled, and if an operation is to occur using the constant transferred from the literal port, the literal port is enabled. Where the R1 port is enabled and a mask byte is inputted from this port, the mask byte is transferred to the multiplier module 19 comprising a multiplier logic circuit 20 (hereinafter "multiplier"), a multiplexer 39, and an arithmetic logic unit 40 (hereinafter "ALU"). In the multiplier, each bit of the mask byte is multiplied by a byte in the word transferred from the R0 port 24. The multiplier 20 multiplies a series of two sets of inputs to generate partial products. The multiplexer 39 then shifts the partial products, and the ALU 40 adds the partial products to obtain a sum.

Figure 3:
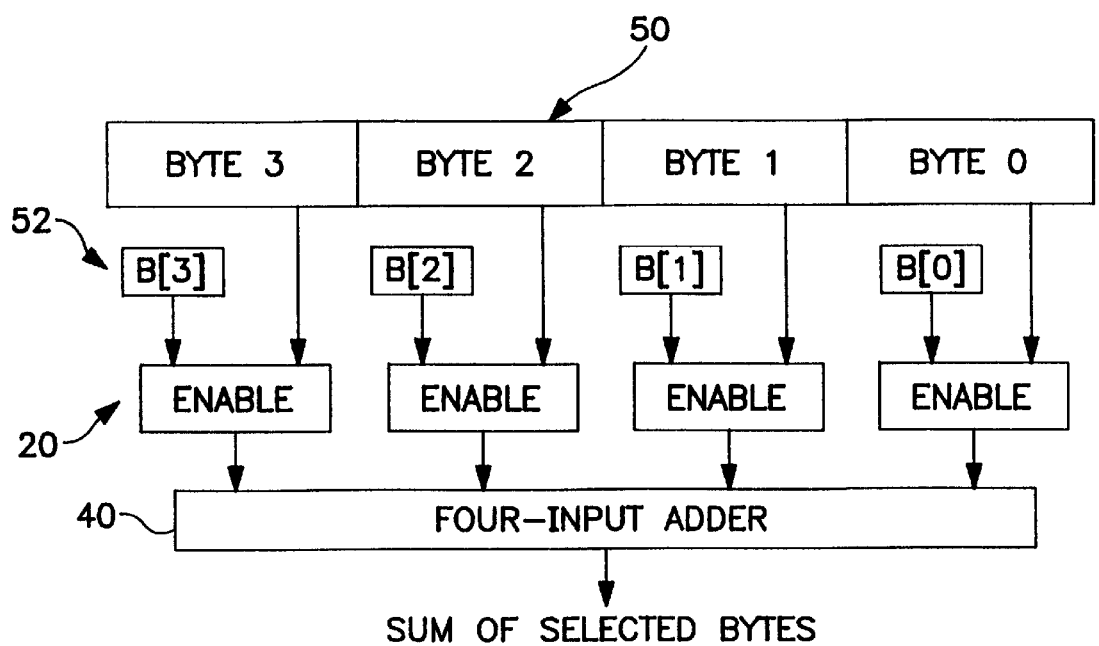
FIG. 3 is a diagrammatic illustration of the method of performing a masked-byte add operation according to one embodiment of the present invention.

Referring briefly to FIG. 3, a diagrammatic illustration of an add masked-byte operation is shown. Word 50 comprises four bytes to be added, shown as bytes 0 through 3. These bytes (0–3) typically represent a section of an image for which smoothing or gray scaling is desired. Bytes 0 through 3 are typically disposed in order of significance in the word, with byte 0 designating the least significant byte and byte 3 designating the most significant byte. As it is often desirable to add less than all four bytes in performing smoothing or gray scaling, certain of the bytes are masked prior to being added, that is, their partial products include a zero.

A mask byte 52 comprising mask bits B(0) through B(3) includes binary digits that specify the bytes to be masked. The bits are also disposed in the order of significance, with bit B(0) designating the least significant bit and bit B(3) designating the most significant bit. The multiplier 20 has a series of two inputs, one input for receiving a byte and another input for receiving a bit (B(0)–B(3)) of the mask byte. The multiplier 20 multiplies each byte by a bit of the mask byte and transfers the product obtained to the ALU or adder 40. If the mask bit is zero, multiplication of zero by the input byte results in a partial product having a zero. If the mask bit is one, multiplication of one by the input byte results in a partial product having a value of the input byte. In each scenario, both partial products may include other values which are cleared during the add operation, as further described. The multiplier 20 thus acts as an "enable," as a byte is passed through or enabled when a mask bit equals one.

Referring again to FIG. 2, as described above, after a multiplication operation takes place in the multiplier 20, four partial products are obtained. Certain of the partial products can include an input byte where the mask bit is one, and certain of the partial products can include a zero where the mask bit is zero. A multiplexer 39 then shifts the partial products obtained until the partial products are disposed in each register at the same register location as the location of the partial product achieved with a least significant input byte. The manner in which the products are shifted is further described in FIG. 4 and FIG. 5. The shifted partial products are transferred to the ALU 40 where the four-way addition operation occurs, extraneous bit values are cleared, and a sum is generated.

Additional processing of the sum can occur after the addition operation is performed. The ALU 40 can further perform comparisons on the values outputted from the R0 and R1 ports. An inserter, shown by INS logic 44, can extract a contiguous bit field of up to 32 bits from the output of the ALU. The combination unit 46 can combine values from the R0 and R1 ports and transfer a resulting value to either a write port associated with the register file 22. Select A/B block 42 further allows choices to be made between different data values. After such additional processing occurs, the sum and/or any additional values obtained, are transmitted to the W port 48 of the register file 22 where the new data can be held and/or written to the SRAM 10.

An example of an instruction for carrying out a masked-byte add operation according to one embodiment of the invention is shown below in Table A. The format of a microcode instruction operation is preferably 32 bits long, with several bits allocated to instruction code and several bits allocated to the registers specification. As shown, bits designated "OPCODE" specify the function to be performed. In the present embodiment, eight bits can be allocated to "OPCODE." The designation "ADDMB" indicates that the function to be performed is a masked-byte addition and can appear in binary as shown below in Table A. Bits allocated to the designation "R0" specify the register that includes the word that is to be inputted to the multiplier. In the present embodiment, five bits can be allocated to "R0." Bits allocated to the designation "RI" specify the register that includes the mask byte to be inputted to the multiplier. In the present embodiment, five bits can be allocated to "R1." Bits allocated to the designation "LIT" specify a constant that can be used in a multiplication operation. In the present embodiment, nine bits can be allocated to "LIT." Bits allocated to the designation "W" specify the register that sum and products can be written to after processing is complete. In the present embodiment, five bits can be allocated to "W."

TABLE A

| OPCODE | R0 | RI | W | LIT |
|---|---|---|---|---|
| 00100111 | 10110 | 00101 | 000001 | 000000001 |

Figure 4:
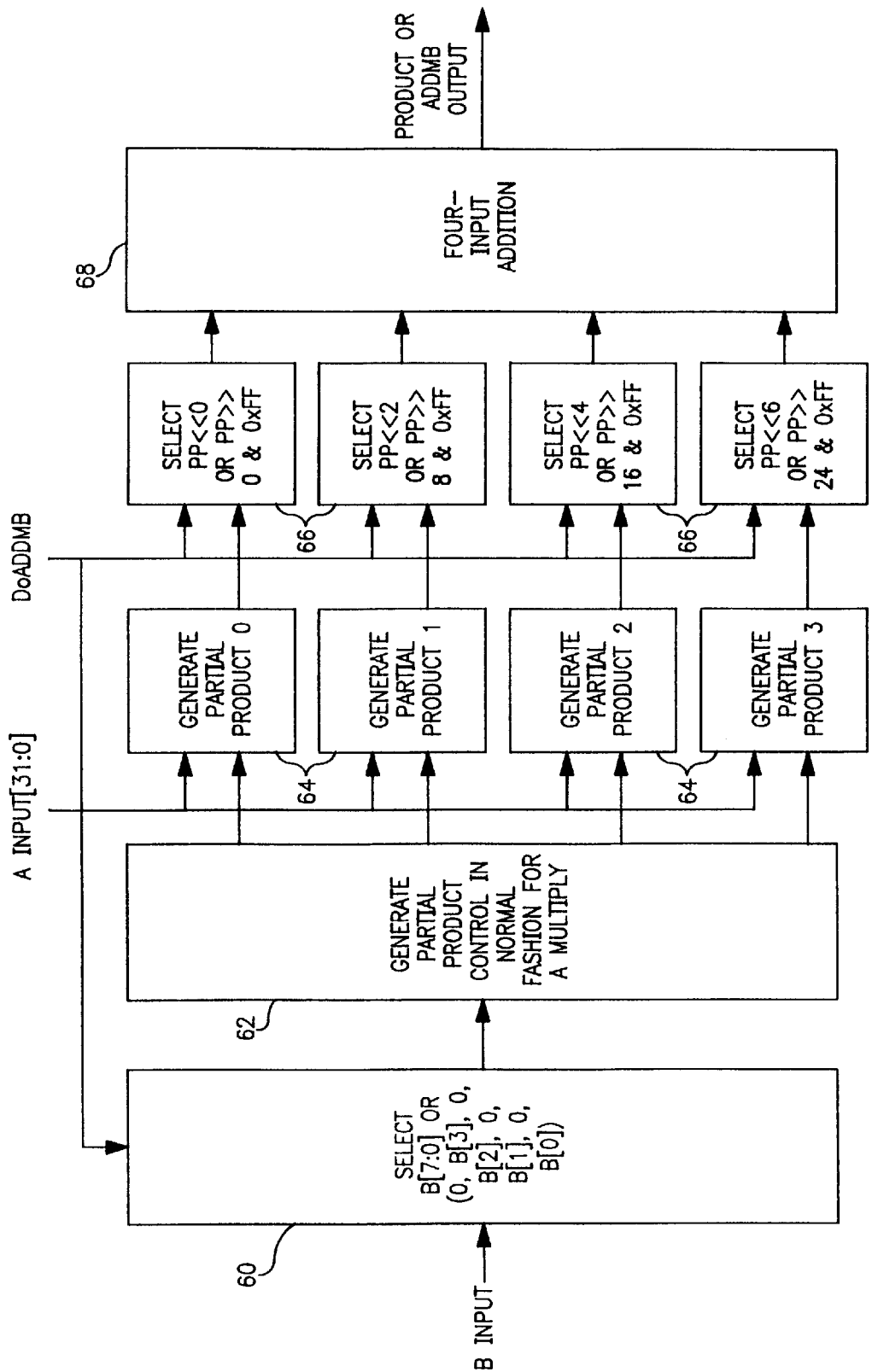
FIG. 4 is a diagrammatic illustration of the stages involved in performing a masked-byte add operation using a multiplier, according to one embodiment of the invention.

Referring to FIG. 4, a diagrammatic illustration of the use of the multiplier to selectively perform a multiplication operation or an add mask byte operation is shown. A word having 32 bits, shown in this figure as A(31:0) is inputted to a multiplier in step 60. Four bytes are then extracted. As described above in FIG. 2, an input to the multiplexer can be a mask byte or other bytes that are to be multiplied by the input byte. The multiplexer selectively enables an input in response to control instructions indicative of whether an add-masked byte operation or a multiplication operation is to occur. Upon receipt of control instructions indicating that an add-masked byte operation is to occur, the multiplexer selectively in step 60 enables the output of R1 and receives a mask byte shown by bits B(0) through B(1). If a multiplication operation is to occur with another input byte over R1, the multiplexer selects all 8 bits shown in this step as bits B(7,0).

Control is passed to step 62, and the multiplier generates partial products. Where an add-masked byte operation is underway, partial products 0 through 4, shown in step 64, will equal include a zero or the value of the input byte. Control is then routed to step 66, where the multiplexer selects whether shifting should occur in a certain manner to accomplish a multiplication operation or an add masked byte operation. If a multiplication operation is to be accomplished, successive partial products are shifted by increments of two bits and then added in step 68. If a masked byte add operation is to be accomplished, successive partial products are shifted by increments of eight bits. For example, the most significant partial product 3 is shifted to the right three by bytes, while the least significant partial product 0, is not shifted at all. After the bytes are shifted, all the relevant values in the partial product appear in the location of the least significant byte, that is, in the first eight bits of the 32 bit word.

After the partial products are appropriately shifted, an AND operation is performed with a value that clears the upper 24 bits of each partial product, shown in FIG. 4 as & 0xFF, representing a byte containing all 1 values. The AND operation clears all bits above bits 0 through 7, (i.e. bits 8 through 31) to ensure that the addition operation is carried out with the relevant partial products. Having undergone a shift and clear, each partial product is then added in the adder to obtain a sum. Additional processing of the sum can be carried out and the sum can be transferred to a register designated by "W" in the instruction code format, as described in Table A.

Figure 5:
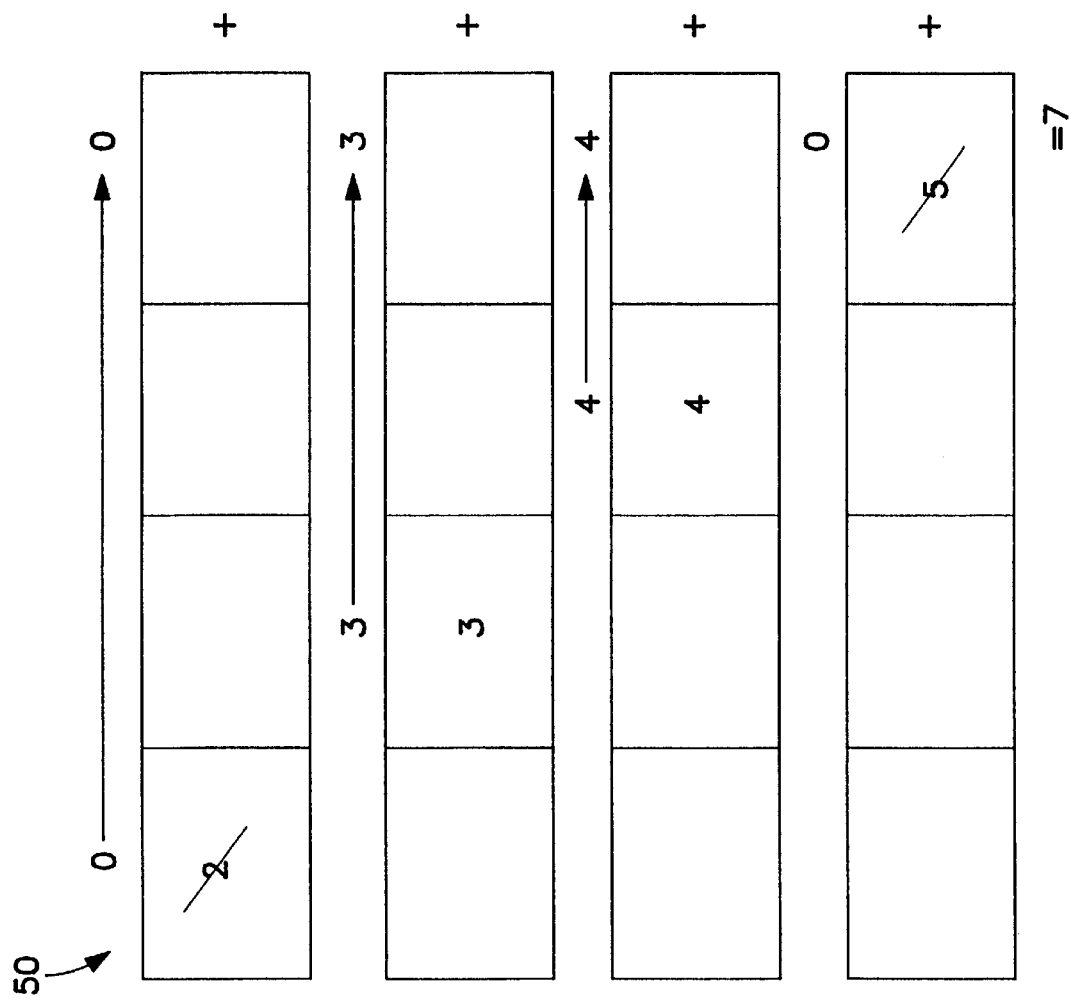
FIG. 5 is an example of an input word multiplied by a masked-byte according to one embodiment of the present invention.
Figure 5:
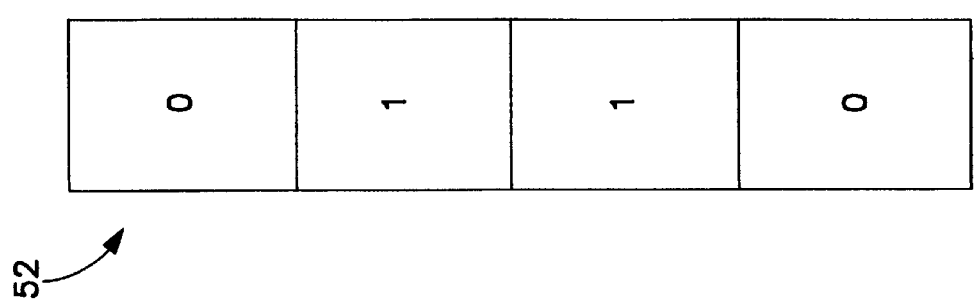

Referring to FIG. 5, an illustration of a word undergoing a masked-byte add operation is shown. As shown, the word can comprise four bytes having, for example, values equal to 2, 3, 4, and 5. Each byte is disposed in a different register location, corresponding to the significance of the byte in the word. As shown, the byte having a value of 2 is the most significant byte, and the byte having a value of 5 is the least significant byte. In this example, the mask byte is a 6, represented as binary 0110. The multiplier multiplies byte value 2 by bit value 0, byte value 3 by bit value 1, byte value 4 by bit value 1 and byte value 5 by bit value 0. Thus, byte values 2 and 5 are masked and byte values 3 and 4 are retained for an addition operation.

A shift operation is then performed according to the significance of the position of the input byte in the word. For example, the most significant byte, now represented by a partial product of 0, is shifted three bytes. The next significant byte, now represented by a partial product of 3, is shifted to the right by two bytes. The next significant byte, now represented by a partial product of 4, is shifted to the right by one byte. As shown, the products are shifted until they are in the same register location as the partial product obtained using the least significant byte, byte 5, now set to 0. Although not shown in this figure, partial products in register locations corresponding to the upper 24 bits are cleared. The partial products are then added successively. The first addition operation is 0 plus 3, yielding a 3. This sum is then added to the next product, 3 plus 4, yielding 7. This sum is then added to the next product, 7 plus 0, yielding a sum of 7. This sum can then be subsequently processed for gray scaling and smoothing.

A multiplier module is typically used in image processing system for performing such operations as rotating and compressing images. The use of a multiplier for performing a masked-byte add in accordance with the present invention, thus eliminates the costs involved in providing additional hardware to an image processing system to perform this operation.

While the invention has been particularly shown and described with reference to the preferred embodiments, it should be understood by those skilled in the art that various changes in form and detail may be made therein without departing from the spirit and scope of the invention as defined by the appended claims.

I claim:

1. Method of adding byte values in a word using a multiplier, comprising:

transferring a plurality of byte values into a first register;

transferring a plurality of mask bit values into a second register; and multiplying each byte value by a mask bit value to obtain a plurality of partial products;

shifting at least one of the partial products; and adding the partial products to obtain a sum.

2. The method of claim 1, wherein the bytes values are assigned an order of significance in a word and the mask bits are assigned an order of significance in a mask byte.

3. The method of claim 2, further comprising:

multiplying the least significant byte of the word with the least significant bit of the mask byte to obtain a first partial product; and multiplying each byte of successive significance of the word with a corresponding bit of successive significance of the mask byte to obtain a plurality of second partial products.

4. The method of claim 3, further comprising:

shifting the plurality of second partial products such that the second partial products are disposed in the same register location as the first partial product; and adding the second partial products to the first partial product.

5. The method of claim 3, further comprising:

setting to zero partial products at other register locations.

6. The method of claim 1, wherein at least one of the bit values of the mask byte results in a partial product of zero.

7. The method of claim 1, wherein at least one of the bit values of the mask byte results in a partial product that equals a byte value.

8. The method of claim 1, further comprising:

multiplying the byte values by the bits of the mask byte in a multiplier; and adding the partial products in an arithmetic logic unit.

9. The method of claim 1, further comprising:

obtaining a sum;

transferring the sum to a third register; and performing a logic operation on the sum.

10. Method of adding byte values in a word using a multiplier, comprising:

providing a first register;

transferring a word comprising a plurality of byte values into the first register;

providing a second register;

transferring a mask byte comprising a plurality of bit values into the second register;

multiplying the least significant byte of the word with the least significant bit of the mask byte to obtain a first partial product;

multiplying each byte of successive significance of the word with a corresponding bit of successive significance of the mask byte to obtain a plurality of second partial products;

shifting the plurality of second partial products such that the second partial products are disposed in the same register location as the first partial product; and adding the second partial products to the first partial product to obtain a sum.

11. The method of claim 10, wherein at least one of the bit values of the mask byte equals one.

12. The method of claim 10, wherein at least one of the bit values of the mask byte equals zero.

13. The method of claim 10, further comprising:

setting to zero partial products at other register locations.

14. The method of claim 11, further comprising:

providing a third register; and transferring a byte value comprising a constant, into the third register.

15. The method of claim 14, further comprising:

multiplying the word by the constant using the multiplier.

16. Apparatus for performing a masked-byte add operation on an input word, the apparatus being embodied in a microchip, comprising:

a first register storing an input word having a plurality of input bytes;

a second register storing a mask byte having a plurality of mask bits;

a multiplication module coupled to the first register and the second register, comprising:

a multiplier for multiplying each bit of the mask byte with an input byte to obtain a plurality of partial products;

a multiplexer for shifting the plurality of partial products by a predetermined number of register locations; and an adder for adding the plurality of partial products to obtain a sum.

17. The apparatus according to claim 16, further comprising:

a module for setting to zero certain values in the partial products.

18. The apparatus according to claim 16, wherein the multiplier multiplies an input byte with a mask bit of corresponding significance.

19. The apparatus according to claim 16, further comprising a register file storing the input word, the mask-byte and non-mask bytes.

20. The apparatus according to claim 19, further comprising:

a second multiplexer coupled to said second register and said register file, said second multiplexer selectively loading a non-mask byte into said second register for multiplication with the input word.

* * * * *